United States Patent [19]

Hendrix et al.

[11] Patent Number: 5,303,055
[45] Date of Patent: Apr. 12, 1994

[54] METHOD AND APPARATUS TO IMPROVE A VIDEO SIGNAL

[75] Inventors: Henry D. Hendrix, Roswell, Ga.; Paul M. Urbanus, Dallas, Tex.

[73] Assignee: Texas Instruments Incorporated, Dallas, Tex.

[21] Appl. No.: 91,471

[22] Filed: Jul. 14, 1993

Related U.S. Application Data

[63] Continuation of Ser. No. 803,246, Dec. 5, 1991, abandoned.

[51] Int. Cl.$^5$ .................. H04N 5/202; H04N 3/14
[52] U.S. Cl. ..................... 348/761; 348/675; 348/771
[58] Field of Search ............. 358/164, 32, 236, 241, 358/236, 56; H04N 5/202, 3/14

[56] References Cited

U.S. PATENT DOCUMENTS

| | | | |
|---|---|---|---|
| 4,368,491 | 1/1983 | Saito | 358/241 X |
| 4,591,902 | 5/1986 | Masubuchi | 358/241 X |
| 5,012,163 | 4/1991 | Alcorn | 358/164 X |
| 5,068,740 | 11/1991 | Brody | 358/241 |

FOREIGN PATENT DOCUMENTS

| | | | |
|---|---|---|---|
| 0155884 | 9/1982 | Japan | 358/164 |
| 0004373 | 1/1986 | Japan | 358/164 |
| 0004374 | 1/1986 | Japan | 358/164 |
| 0092171 | 4/1988 | Japan . | |

Primary Examiner—Victor R. Kostak
Attorney, Agent, or Firm—Julie L. Reed; James C. Kesterson; Richard L. Donaldson

[57] ABSTRACT

A method and circuit for improving a video signal. They can be used to nullify the gamma correction applied at the broadcast end for cathode-ray tube signals when using a spatial light modulator display. Additionally, the method and circuit can be used to generally improve the quality of the display for computer monitors or other formats that do not require the gamma nullification.

10 Claims, 2 Drawing Sheets

METHOD AND APPARATUS TO IMPROVE A VIDEO SIGNAL

This application is a continuation of application Ser. No. 07/803,246 filed Dec. 5, 1991, which is now abandoned.

BACKGROUND OF THE INVENTION

1. Field of the Invention

This invention relates to digital displays, more particularly to digital signal processing of the video signal in such displays.

2. Background of the Invention

Most televisions in use today utilize a cathode-ray tube (CRT) display. Because of this standard broadcast signals have been optimized for this format. Digital television, namely those using binary (ON/OFF) spatial light modulators, such as liquid crystal displays (LCD) or deformable mirror device (DMD) displays, have a different input signal requirement for their displays, which can result in a much better picture.

The relationship between displayed brightness and the input voltage is not linear. It is exponential. The output brightness varies according to the following formula:

$$B = V^\gamma$$

where B is brightness, V is the input voltage, and the exponent "$\gamma$", is referred to as gamma. Depending on the CRT used, gamma varies from 2.2 to 3.0. This non-linearity has the effect of compressing the black or low-end portion of the signal, causing low contrast in the low-light areas.

To correct for this non-linearity in standard, CRT based systems, an inverse function:

$$V_{out} = V_{input}^{1/2.5}$$

is added by the broadcaster sending the signal. This allows the displayed picture to be approximately linear.

In the move to digitized television, a problem arises. Television using spatial light modulators may not need this correction, and it can even interfere with the quality of display on such a television. Some digital systems have a direct linear relationship between brightness and input voltage. The problem is eliminating or nullifying the gamma correction added by the broadcaster in the television system. This allows for compatibility between CRT-based and digital televisions and any standard format. Use of such a nullification regardless of any gamma applied or not applied may also have an improving effect upon the picture displayed.

SUMMARY OF THE INVENTION

Objects and advantages will be obvious, and will in part appear hereinafter and will be accomplished by the present invention which provides a correction method and circuit to eliminate the gamma correction from standard television broadcast, and to increase the overall quality of the picture. The incoming signal is digitized and fed to a circuit in which the input signal is mapped to a corresponding output signal that either eliminates the gamma correction or increases the quality of the picture, or both.

BRIEF DESCRIPTION OF THE DRAWINGS

For a complete understanding of the invention, and the advantages thereof, reference is now made to the following description in conjunction with the accompanying drawings, in which.

DETAILED DESCRIPTION OF THE PREFERRED EMBODIMENTS

Figure 1:
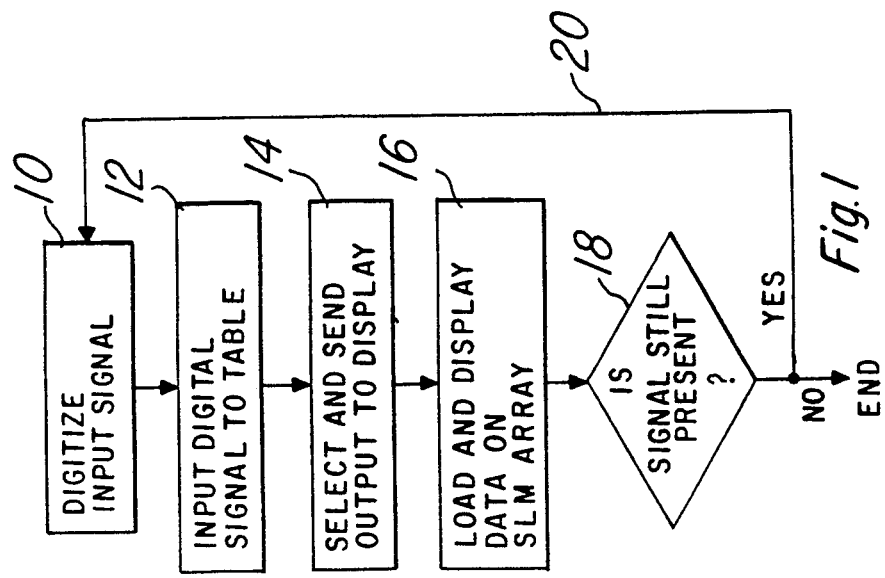
FIG. 1 is a flow chart for a method of signal improvement.

FIG. 1 shows a flow chart for a method to nullify the gamma correction compensation applied by the broadcaster. Additionally, this method can be used on a signal that did not have gamma applied, to generally improve the signal quality and its resultant display on a spatial light modulator array.

The incoming broadcast signal is digitized into a pre-determined number of samples per line, with a pre-determined number of bits per sample, in step 10. These values are up to the designer and the equipment selected to do the conversion. For example, the designer may decide that the samples per line should be 640, and the samples should be 24 bits each, 8 bits for red, green and blue. The analog-to-digital converters need to be configured with these parameters in mind.

After the signal is digitized into digital words, the words are passed to a look-up table, in step 12. The input signal is mapped, via the look up table, to a second digital word that will become the output word, in step 14. The proper memory table for that particular input word is determined by a control block.

Spatial light modulator displays typically have addressing circuitry for each element of the array, or at the very least, a bank of registers where the data is held before being loaded onto the array. In the case of the deformable mirror device (DMD), there are both. Other spatial light modulators can be used, but the discussion will be centered upon deformable mirror device displays. The addressing circuitry is connected to the output of the memory, either directly, or through a holding register. After the word is selected in step 14, step 16 allows for the word to be passed to the addressing circuitry of the device, and displayed. In DMD displays, the words are not displayed a word at a time. The word would normally be held in a frame memory, and the whole frame displayed at once. In step 18, the system checks to see if the incoming signal is still active. If it is, the flow then returns to step 10, via path 20, and the process is repeated. If the signal is no longer active, the system has been turned off, and the process is no longer required. To do this one word at a time would be prohibitively slow. This can be implemented in any combination of serial and parallel inputs the designer desires.

Figure 2:
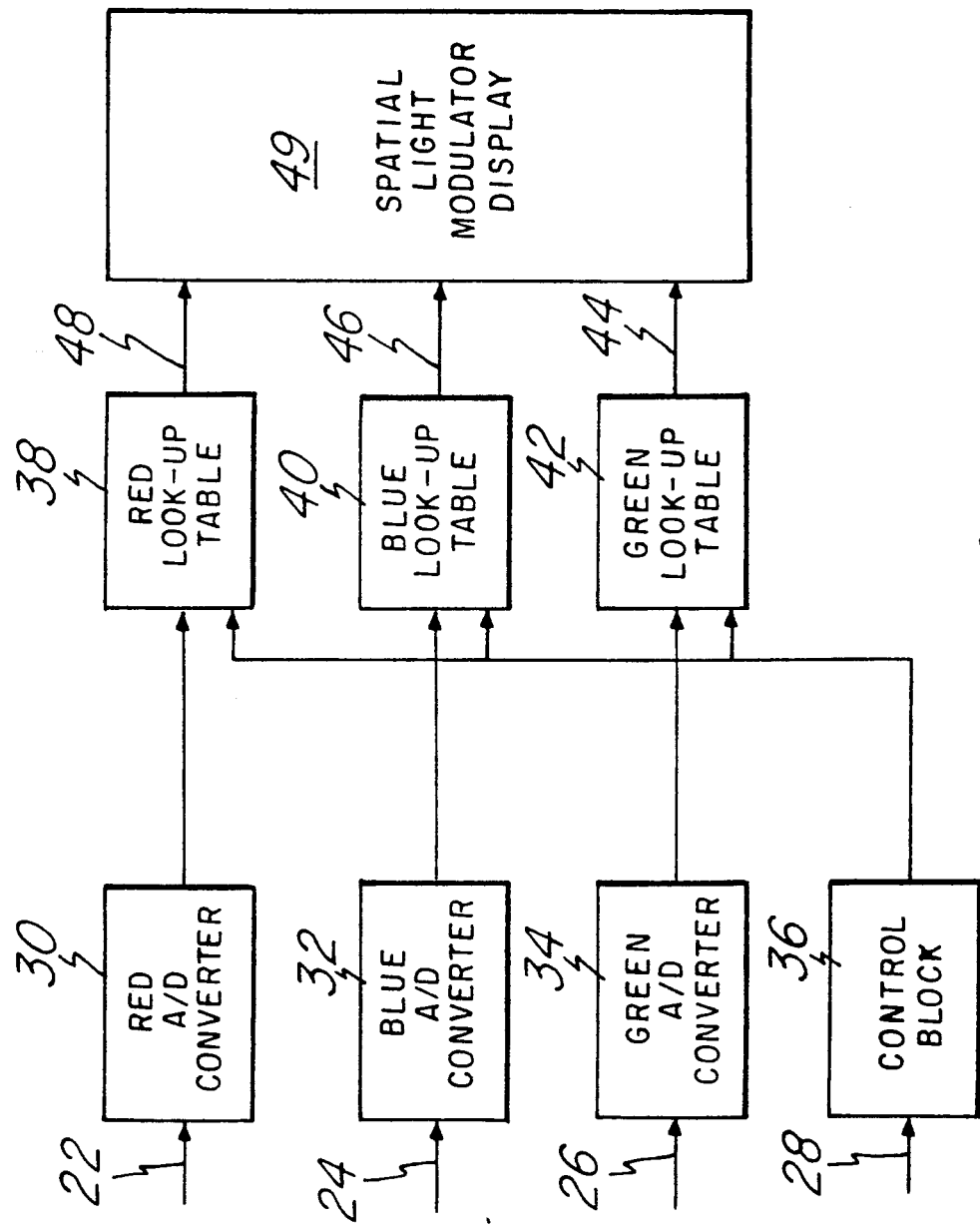
FIG. 2 is an example of a three-color divided signal improvement circuit.

One embodiment of a three-color system is shown in FIG. 2. Each color input is passed to a dedicated analog-to-digital converter. For example, analog red is passed into A/D converter 30 on line 22, analog green is passed into A/D converter 32 on line 24, and analog blue is passed into A/D converter 34 on line 26. Red digital exits the A/D 30 on a bus that is as many bits wide as the number of bits per sample, i.e. the sample is passed in parallel. The bus terminates in a red look-up table 38. Similarly, green digital data exits the A/D 32 and is passed to green look-up table 40 via a bus, and blue digital is passed from A/D 34 to blue look up table 42. The table select signal which designates which table is used, is input into the control block 36 which passes it to all three look-up tables. The resultant data for red, green and blue output exits the correction block on lines 48, 46, and 44, respectively. The look up tables could be any form of memory, such as RAM, ROM, EPROM, EEPROM, etc., as long as they can be read at the input clock rate. In this system, the tables are 1K×8 EPROMS. In the preferred embodiment, each analog-to-digital converter would have a dedicated memory look-up table. Therefor, if the system is a three-color system, three memory look-up tables are used.

There are many possible modifications of this method. One possible is that the television standard will no longer be analog. In this case, the step to digitize the input signal could be eliminated. If the signal was coming from another source, the improvement could still be applied for generally high picture quality. This is especially important in non-broadcast signals, such as in computer monitors. While the impetus behind the invention was the problem of eliminating gamma correction, it has resulted in an improved picture regardless of the transmission format.

Since the mapping function applied by the look-up tables is a non-linear function, using a digital input signal can cause loss of resolution on the output. This is illustrated in the following table.

TABLE 1

| DIGITIZED INPUT LEVEL | | GAMMA-CORRECTED LEVEL |
|---|---|---|
| 8 BITS | 10 BITS | 8 BITS |
| 0–15 | 0–63 | 0 |
| 16–23 | 64–99 | 1 |
| 24–31 | 100–127 | 2 |
| 32–39 | 128–155 | 3 |
| . | . | . |
| . | . | . |
| . | . | . |
| NONE | 1014–1015 | 251 |
| 254 | 1016–1017 | 252 |
| NONE | 1018–1019 | 253 |
| 255 | 1020–1021 | 254 |
| NONE | 1022–1023 | 255 |

In the table, it is seen that 8-bit inputs have a possibility of 256 outputs. However, with the 8-bit outputs, the mapping produces only 184 unique output values, much less than the desired 256. At the low end, several input values map to the same output value. At the high end, output values are skipped, thus removing these values from any possibility of being displayed.

To increase the output resolution, the number of unique output values must be increased at some point. If the output word size is increased, the low-end data more closely resembles a 1:1 mapping. Unfortunately, this also causes the high-end side to skip even more codes. If the input word size is increased, the number of unique output levels will increase drastically as shown in Table 2.

TABLE 2

| INPUT BITS | OUTPUT BITS | OUTPUT LEVELS | MISSED CODES |
|---|---|---|---|
| 8 | 8 | 184 | 72 |
| 9 | 8 | 254 | 2 |

TABLE 2-continued

| INPUT BITS | OUTPUT BITS | OUTPUT LEVELS | MISSED CODES |
|---|---|---|---|
| 10 | 8 | 256 | 0 |

The low-end data resolution will not be improved, but the high-end will show a great increase in resolution. With the addition of only one input bit, the improvement is marked. To achieve the desired 256 levels, however, two additional bits are used. Therefore, to achieve 256 levels, 10-bit input words are used, not 8-bit.

The system level integrations of this function are numerous. In its simplest form, the improvement circuit requires no control block. A single mapping function is contained in the look-up tables, and the inputs are converted using this one mapping. However, by using larger look-up tables, several different mapping functions are available for use. The control block would then select the function to use. Again, as mentioned previously, it is possible to use this concept of correction for more than just canceling the gamma correction used in broadcast television.

For example, if the user was using the display as a computer, they could select a 1:1 mapping through the look-up table for a better picture. If several values were being used, the user could just experiment until he/she finds one that looks the best. If it was decided that users did not want that ability, the control block could be set up to automatically select a certain correction function based upon the system configuration or use.

Figure 3:
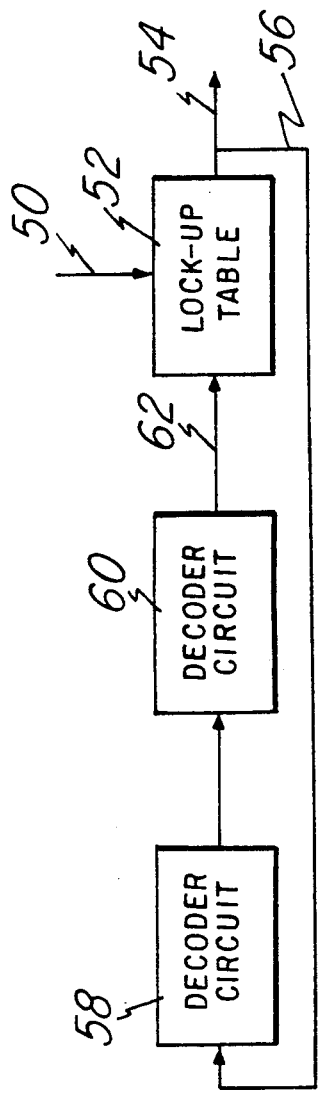
FIG. 3 is an example of an adaptive control signal improvement circuit.

Additionally, adaptive control of the correction function can be done by monitoring the video signal, as illustrated in FIG. 3. The input signal 50 is sent to the look-up table 52, which outputs signal 54. A circuit 58 detects the highest video level present in the current video frame via path 56, decodes it with circuit 60, and selects a mapping based upon that level, via signal 62. If the scene is very dark, for example, a mapping which boosts the low levels may be selected. Conversely, if the scene is very bright, a mapping which compresses the low levels could be selected. The selection process can be very complex as well, performing detailed analysis of the current and past video data. The mapping can be changed at any point and at any frequency. It can be changed anywhere from a frame-by-frame basis to a pixel-by-pixels basis.

Another possibility for the gamma correction function alone, would be to encode the broadcast gamma in to the video signal. The correction circuit would then be set up for gamma nullification based upon that encoded data, and the resultant picture would be extremely close to that originally recorded by the camera. But, this circuitry may be used for correction of the signal outside of the gamma nullification function. It may be used just for a better picture.

Thus, although there has been described to this point a particular embodiment for a circuit to improve display signals for spatial light modulator displays, it is not intended that such specific references be considered as limitations upon the scope of this invention except in-so-far as set forth in the following claims.

What is claimed is:

1. A method for improving a compensated broadcast signal comprising:
   a. providing an input digital word;
   b. looking up said digital word in a memory table;

c. removing said compensation by selecting a digital output signal corresponding to said digital input signal, wherein said digital output signal has a lower number of bits than said digital input signal;

d. sending said digital output signal to a spatial light modulator array;

e. loading said digital output signal onto said array; and f. displaying image data represented by said digital output signal.

2. The method of claim 1 wherein said providing step includes the use of three analog-to-digital converters, such that one analog-to-digital converter is dedicated to each of three input color signals.

3. The method of claim 1 wherein said looking up step is directed by control circuitry external to said memory table.

4. The method of claim 1 wherein said spatial light modulator array comprises a deformable mirror device array.

5. The method of claim 1 wherein said spatial light modulator array comprises an array of liquid crystal cells.

6. A circuit for improving a compensated broadcast signal comprising:

a. at least one analog-to-digital converter for receiving said signal and digitizing it into a digital word;

b. at least one memory look-up table in electrical connection with said analog-to-digital converter, wherein said look-up table contains a map of said digital word corresponding to a second digital word, operative to at least remove said compensation;

c. addressing circuitry connected to said analog-to-digital converter, operable to receive said second digital word; and d. an array of spatial light modulators connect to said addressing circuitry, operable to display image data represented by said second digital word.

7. The system as claimed in claim 6 wherein each said analog-to-digital converter is in electrical connection with a dedicated memory look-up table.

8. The system as claimed in claim 6 wherein said spatial light modulator array is comprised of deformable mirror cells.

9. The system as claimed in claim 6 wherein said spatial light modulator array is comprised of liquid crystal cells.

10. The system as claimed in claim 6 wherein said at least one analog-to-digital converter includes three analog-to-digital converters.

* * * * *